United States Patent
Larson

(10) Patent No.: US 8,378,655 B2
(45) Date of Patent: Feb. 19, 2013

(54) DETERMINING INITIAL PRE-BIAS IN A SWITCH-MODE CONTROLLER FOR A BUCK CONVERTER DEVICE

(75) Inventor: Bruce C Larson, Austin, TX (US)

(73) Assignee: Maxim Integrated Products, Inc., San Jose, CA (US)

(*) Notice: Subject to any disclaimer, the term of this patent is extended or adjusted under 35 U.S.C. 154(b) by 68 days.

(21) Appl. No.: 12/615,973

(22) Filed: Nov. 10, 2009

(65) Prior Publication Data
US 2011/0109294 A1 May 12, 2011

(51) Int. Cl.
G05F 1/00 (2006.01)
(52) U.S. Cl. .......................... 323/284; 323/901
(58) Field of Classification Search .............. 323/223, 323/224, 238, 271, 282, 284, 285, 351, 901, 323/321; 363/49
See application file for complete search history.

(56) References Cited

U.S. PATENT DOCUMENTS

| | | | |
|---|---|---|---|
| 7,598,715 B1 | 10/2009 | Hariman et al. | |
| 7,834,601 B2* | 11/2010 | Aiura et al. | 323/266 |
| 7,868,595 B1* | 1/2011 | Smith | 323/222 |
| 2005/0088212 A1* | 4/2005 | Leith et al. | 327/198 |
| 2005/0258808 A1* | 11/2005 | Chen et al. | 323/222 |
| 2007/0064454 A1* | 3/2007 | Chen et al. | 363/49 |
| 2007/0195565 A1 | 8/2007 | Noma | |
| 2009/0001946 A1* | 1/2009 | Mehas et al. | 323/266 |
| 2009/0167267 A1 | 7/2009 | Dwarakanath et al. | |

OTHER PUBLICATIONS

PCT: International Search Report and Written Opinion of PCT/US2010/056108 (counterpart application); Jul. 1, 2011, 9 pgs.

* cited by examiner

*Primary Examiner* — Gary L Laxton
*Assistant Examiner* — Gustavo Rosario Benitez
(74) *Attorney, Agent, or Firm* — Advent IP, P.C., L.L.D.

(57) ABSTRACT

A switch-mode controller, buck converter or DC to DC step-down regulated voltage converter that senses an initial pre-bias voltage at initialization and adjust a duty cycle of the switching frequency to help minimize an output voltage transient at initialization or power-on reset.

17 Claims, 6 Drawing Sheets

DETERMINING INITIAL PRE-BIAS IN A SWITCH-MODE CONTROLLER FOR A BUCK CONVERTER DEVICE

TECHNICAL FIELD

The present invention relates generally to a buck converter, which is a step-down DC to DC voltage converter that converts a higher input DC voltage to a lower output DC voltage while regulating the output voltage. More particularly, the present invention relates to a switch-mode controller within a buck converter circuit that senses a pre-bias voltage at the buck converter's voltage output and adjusts the duty cycle of the buck converter's circuitry accordingly to minimize an output voltage transient at device start-up.

BACKGROUND

A buck converter is a step-down DC to DC voltage converter that converts a higher DC voltage input to a lower and regulated DC voltage output. A buck converter's design may be similar to that of a step-up boost converter, and like some boost converter circuitry it is a switched-mode power supply that incorporates two solid state switches (i.e., a transistor and a diode or two transistors), an inductor and a capacitor to convert an input DC voltage to a regulated output DC voltage.

The simplest way to reduce a DC voltage is to use a voltage divider circuit. The problem with voltage divider circuitry is that they waste energy since they operate by bleeding off excess power as heat through a resistor. Furthermore, with a basic voltage divider circuit the output voltage is not regulated. When a voltage is not regulated it means that the output voltage varies with the input voltage. A buck converter, on the other hand, is a remarkably efficient and self regulating circuit making it useful for converting 12 to 50 volts DC down to, for example, a regulated lower voltage such as 0.5 to 10 volts DC, which may be needed for various circuits and sub-circuits within an electronic device.

Referring now to FIG. 1 wherein a general prior art buck converter circuit is depicted we see a DC voltage input 10 of the buck converter and the DC stepped-down voltage output 12 of the buck converter. Between the input 10 and the output 12 of the buck converter is a high-side switching transistor 14 and a low-side switching transistor 16. In some buck converters the low-side switching transistor 16 is replaced with a diode (not specifically shown). The high and low-side switches 14 and 16 may be MOSFETS, JFETS or BJT transistors or reasonable derivations thereof. A pulse width modulator 18 provides a modulated signal 20 to the high-side switch 14. An inverter 22 may be provided to provide an inverted DH signal or DL signal 24 to the low-side switch 16. In some embodiments, an inverter is not used, but is instead provided within the circuitry of the pulse width modulator and a DH signal 20 and a DL signal 24 are provided as separate outputs from the pulse width modulator 18. An exemplary DH signal 20 is shown as signal 21 having a duty cycle 26 wherein a first part of the duty cycle is high 28 and a second part of the duty cycle is low 30.

A buck converter typically has an error amplifier 32 that senses a feedback voltage $V_{FB}$ 34, which is the output voltage 12 attenuated by a resistor voltage dividing circuit comprising resistors R1 36 and R2 38. The feedback voltage 34 is provided to one of the inputs of the error amplifier 32 wherein the feedback voltage 34 is compared with a reference voltage ($V_{REF}$) 40. A voltage reference is generally created by some type of voltage reference circuit 42, which may provide a constant voltage reference 44 or a soft start voltage reference 46, which starts at 0 volts and then rises to a constant or fixed voltage much like the fixed voltage reference 44. The error amplifier 32 compares the feedback voltage 34 with the voltage reference 40 and will try to drive the feedback voltage to equal the voltage reference thereby driving or regulating the voltage output 12 to be at some predetermined output voltage.

In other words, the error amplifier 32, which is typically found in a buck converter, senses the voltage of the $V_{OUT}$ node 12 attenuated by the resistor voltage divider network comprised of resistors R1 36 and R2 38 at the voltage feedback node 34. The feedback voltage 34 is then compared with a voltage reference 40 in the error amplifier 32 such that the error amplifier produces a control signal 48 that is used to set the duty cycle of the pulse switching of the high-side transistor 14 and the low-side switch or transistor 16 via the pulse width modulation circuit 18. The continuous control signal 48 coming out of the error amplifier 32 is transformed into the DH signal 20, which is a pulse width modulated signal provided by the pulse width modulation circuit 18. The DH signal is used to drive the high-side transistor 14 and, if a low-side transistor is used, to drive the low-side transistor 16 as well. In some embodiments the low-side transistor 16 is not used, but instead a diode or a rectifier is used in its place.

The switching of the high and low sides of the switching circuitry 14 and 16 operates at a higher bandwidth or frequency than the bandwidth of the feedback loop provided by the feedback voltage 34. A duty cycle of the switching creates a chopped pulse width modulated signal at the switching node 50. A possible modulated signal 52 that may be present at the switching node is shown. When the switching signal DH 20 is high, it turns the high-side switch 14 on and drives the voltage at the switching node 50 high to be about equal to the input voltage found at $V_{IN}$ 10. When the DH signal 20 goes low then the DL signal 24 is high, which turns on the low-side switch 16, which will pull the switching node 50 (also known as the LX node) to ground. The resulting chopped modulated signal 52 found at the switching node 50 proceeds through the inductor 54 to the output voltage 12. The inductor 54 smoothes out the chopped voltage of the pulse width modulated signal 52. Smoothing of the modulated signal 52 at the switching node 50 by the inductor 54 and capacitor 56 creates a nearly constant DC voltage output at the voltage output node 12. Generally the value of the output voltage at the voltage output 12 is equal to the average value of the modulated signal 52 found at the switching node 50. Furthermore, the average value of the modulated signal 52 at the switching node 50 is roughly equal to the duty cycle of the switching times the input voltage (assuming that when the low-side switch 16 is turned on it is pulling the switching node voltage to ground). For example, if the duty cycle is 20% (i.e., 20% on, 80% off) then the output voltage at $V_{OUT}$ 12 will be approximately 20% of the input voltage found at $V_{IN}$ 10.

The feedback voltage 34, which is an attenuated voltage of the output voltage found at $V_{OUT}$ 12, is then fed back to the error amplifier 32 and compared with the voltage reference voltage 40. The error amplifier senses the difference between the voltage reference voltage 40 and the feedback voltage 34 and adjusts its output signal 48 to change the pulse width modulated signal being produced by the pulse width modulator 18 and, so the buck regulator uses feedback to regulate its stepped down output voltage.

Still referring to FIG. 1, it is important to understand drawbacks of a step-down or buck converter that operates similarly to the buck converter circuitry of FIG. 1. In particular, the output voltage of a prior art buck converter can cause damage to the circuitry that is being powered. For example, if at start up, the output voltage found at the voltage output 12 is 0 volts and the voltage reference 40 being provided to the error amplifier 32 is a steady state voltage reference voltage 44, then the error signal or modulation control signal 48 that is output from the error amplifier 32 will push the pulse width modulator 18 to produce a very large duty cycle modulation signal to the switching transistors 14 and 16. A very large duty cycle means that the high-side switching transistor 14 will be held "on" for a long period of time basically creating an enormous amount of current flowing through the switching node 50 and the inductor 54. The current indicated by $i_L$ 60 could be damaging to the switching transistor 14 and/or the inductor 54. Furthermore, with such a large duty cycle being provided by the DH modulation signal 20 (i.e., the high part of the duty cycle signal 28 would extend for the majority of the duty cycle signals cycle length 26. The large duty cycle may produce an excessive output voltage at $V_{OUT}$ 12 that causes the feedback voltage 34 to overshoot the reference voltage 44, which is necessary to balance or provide a correct voltage output at $V_{OUT}$ 12, forcing the error amplifier 32 to swing the voltage error signal 48, provided to the pulse width modulator circuitry 18, the other direction such that the duty cycle 28 would be quite short and thus the high-side switching transistor 14 would be turned off and the low-side switching transistor 16 (or low-side diode) would be turned on pulling the switching node 50 to ground. This "ringing" of the output voltage 12 would continue to occur until the voltage feedback 34 and voltage reference 40 voltages were smoothed out by the feedback loop of the error amplifier 32 in conjunction with the pulse width modulator 18. One major problem of this type of turning on or initializing a buck converter is that the circuitry (not specifically shown) that receives the voltage output 12 is generally low voltage and sensitive circuitry that may not necessarily be able to handle an over voltage at the $V_{OUT}$ node 12. A high output voltage 12 that is higher than expected by the circuitry being driven by the output voltage 12 of the buck converter, may damage the sensitive circuitry receiving power from the buck converter.

Another problem with the design of the prior art buck converter found in FIG. 1 occurs when the output voltage at the $V_{OUT}$ 12 of the buck converter is floating at a non-zero voltage when the buck converter is turned on or initialized. For example, if for some reason the output voltage at $V_{OUT}$ 12 is at or near about half the output voltage that the buck converter is to produce, then the V feedback voltage 34 will be initially much smaller than the voltage reference voltage 40 at the input of the error amplifier 32. This situation will once again cause the pulse width modulator 18 to produce a modulation signal 20 having a very large duty cycle 28 that forces the high-side switching transistor 14 to be on for long periods of time thereby, like the previous example, over shooting the desired output voltage at $V_{OUT}$ 12 initially at start up until the feedback voltage 34, in conjunction with the error amplifier and the other feedback circuitry 32, 18 can bring the output voltage into a steady state.

In an attempt to solve these problems the prior art created something called a soft start voltage ramp shown in FIG. 1 in the voltage reference circuit 42 as the soft start voltage reference signal 46. A soft start voltage reference 46 provides a reference voltage at start up or initialization of 0 volts and over a short period of time the voltage reference 46 ramps up to a steady state voltage reference, which continues to be used by the feedback circuitry of the buck converter to keep the output voltage at $V_{OUT}$ 12 of the buck converter at a steady output voltage. In other words, the soft start voltage reference signal starts at 0 volts and then ramps up to a steady state voltage as shown by the soft start voltage reference 46 in FIG. 1. In this prior art solution, if the output voltage at $V_{OUT}$ 12 is initially 0 volts then the soft start signal 46 works very well because there is a very small difference between the voltage feedback signal 34 and the voltage reference signal 40 at the input of the error amplifier 32. The error amplifier will output a voltage error signal 48, which will make the pulse width modulator produce a DH or modulation signal 20 with a duty cycle that will more likely than not produce voltage output at $V_{OUT}$ 12 that will usually not be too high for the circuitry powered by the buck converter. Here the error amplifier 32 will slowly increase and settle the signal to an appropriate output voltage using the soft start voltage signal 46 in conjunction with the voltage feedback signal 34. In essence, the voltage output voltage, more often than not, will rise with the voltage reference signal 46 in a controlled manner when the output voltage at $V_{OUT}$ 12 is initialized with a 0 volt bias at start up.

Conversely, the soft start voltage reference technique does not work when the output voltage at $V_{OUT}$ is at an intermediate voltage and the buck converter circuit is initialized. In other words, this prior art technique of using the soft start voltage reference 46 does not work very well when the output voltage at $V_{OUT}$ 12 is biased to a voltage that is between 0 volts and the desired output voltage of the buck converter. This condition is sometimes termed as a pre-biased voltage output condition. For example, if a soft start ramp is used and the prior art buck converter is initialized when the output voltage at $V_{OUT}$ 12 is in a pre-biased state, then the voltage feedback signal 34 and the voltage reference signal 40 will have a large error due to the soft start ramp voltage signal starting at 0 volts and the voltage feedback signal being greater than the initial start ramp voltage. Thus, the pulse width modulator 18 receives a signal from the error amplifier trying to reduce or increase or correct the duty cycle of the DH signal 20 causing the same problems as discussed above when a steady state voltage reference signal 44 was utilized. Here the pulse width modulator in conjunction with the error amplifier will be attempting to drive the output voltage at $V_{OUT}$ 12 down to 0 volts to match the soft start voltage reference signal 44 even though the voltage output is already biased at a non-zero voltage.

SUMMARY

Embodiments of the invention provide a method of determining a pre-bias voltage at the start up or at a power on reset of a switch-mode controller or buck converter. The method comprises receiving an input voltage or a power on reset signal by a switch-mode controller. A voltage reference signal having a predetermined voltage is generated. The voltage reference is compared with a feedback voltage and if the voltage reference is less than the feedback voltage then the voltage reference and the feedback voltage are continued to be compared. Conversely, if the voltage reference is greater than or equal to the feedback voltage then an initial switching node voltage is measured. In some circumstances instead of the switching node voltage being measured an initial equivalent voltage such as an output voltage is measured. The initial switching node voltage or equivalent voltage is then utilized to set an initial pulse width modulation signal such that at least one switching transistor associated with the switch-mode controller produces an output voltage substantially equal to the initial switching node voltage or the equivalent voltage that was measured.

In another embodiment of the invention a switch-mode controller is provided. The switch-mode controller comprises a voltage reference mode having a reference voltage thereon. A voltage input node is adapted to receive an input voltage. A comparator circuit is provided that compares the reference voltage with a feedback voltage. The comparator, based on the comparison of the reference voltage and the feedback voltage outputs a start signal when the feedback voltage is less than or equal to the reference voltage. The switch-mode controller further comprises a pre-bias initialization circuit that measures an initial voltage at a switching node of a buck converter or an equivalent node, such as an output of the buck converter at initialization, and outputs an initial duty cycle signal upon receipt of the start signal. Furthermore, a pulse width modulation circuit is configured to provide a pulse width modulation output signal first in response to receipt of the start signal and the initial duty cycle signal and second, in response to an output of an error circuit that provides an error signal based on a feedback voltage and a reference voltage.

In yet another embodiment of the invention a buck converter is provided that comprises a switch-mode controller circuit adapted to sense an initial voltage of the buck converter switching node prior to the buck converter's switching transistor or transistors receiving a switching signal. The initial switching node voltage is used to preset a pulse width modulation circuit such that the output of the buck converter is initially substantially equal to a pre-bias voltage measured at the switching node just prior to initialization.

Embodiments of the invention provide a switch-mode controller, buck converter or step-down DC/DC voltage converter that senses a pre-bias voltage at the buck converter's voltage output and adjusts the duty cycle of the buck converters circuitry accordingly to minimize an output voltage transient at device initialization, power on reset or start up.

BRIEF DESCRIPTION OF THE DRAWINGS

For a more complete understanding, reference is now made to the following description taken in conjunction with the accompanying Drawings in which.

DETAILED DESCRIPTION

Figure 1:
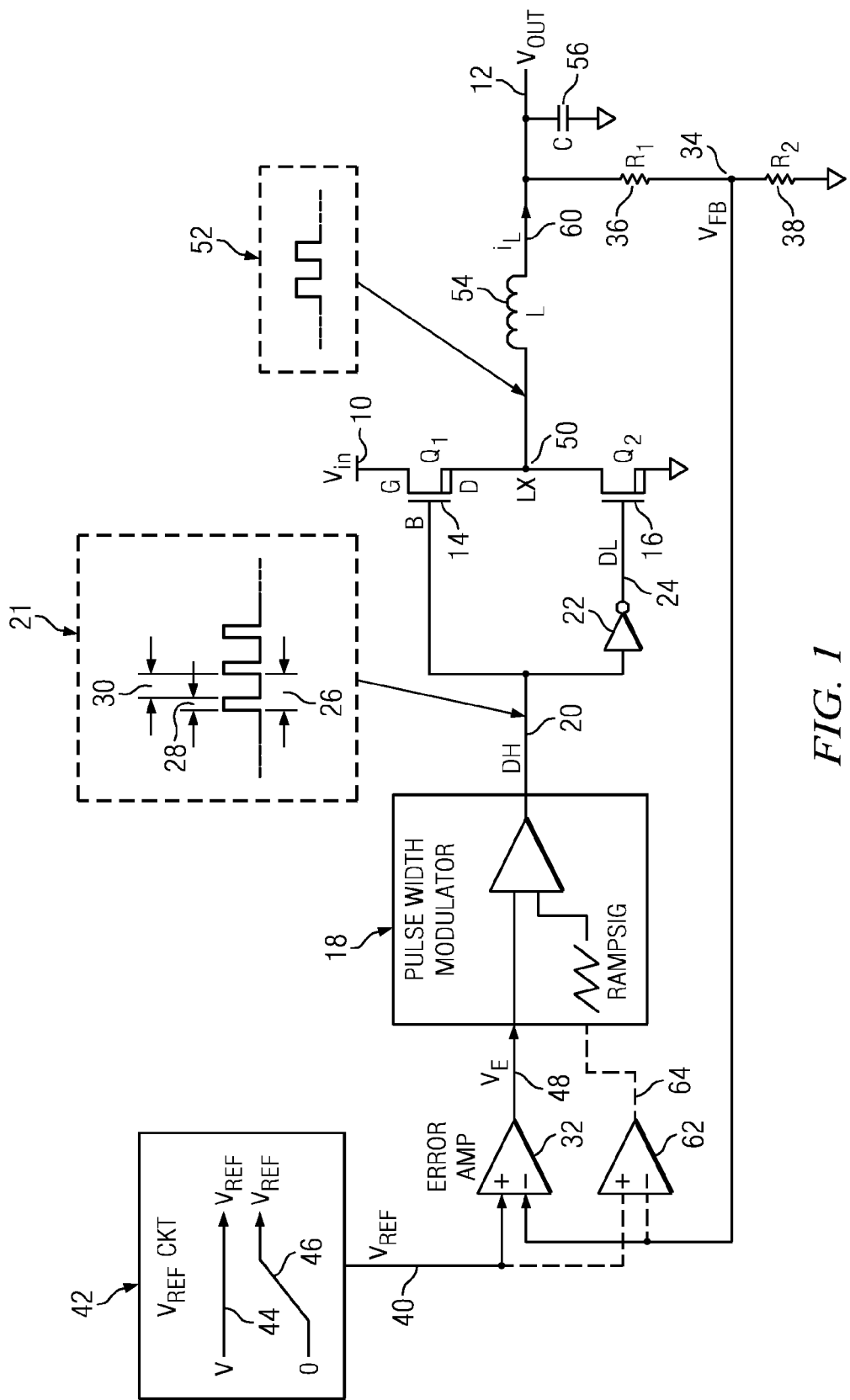
FIG. 1 illustrates a block diagram schematic of a prior art buck converter.

Referring now to the drawings, wherein like reference numbers are used herein to designate like elements throughout, the various views and embodiments of a method for determining pre-bias in a switch-mode controller are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 2A:
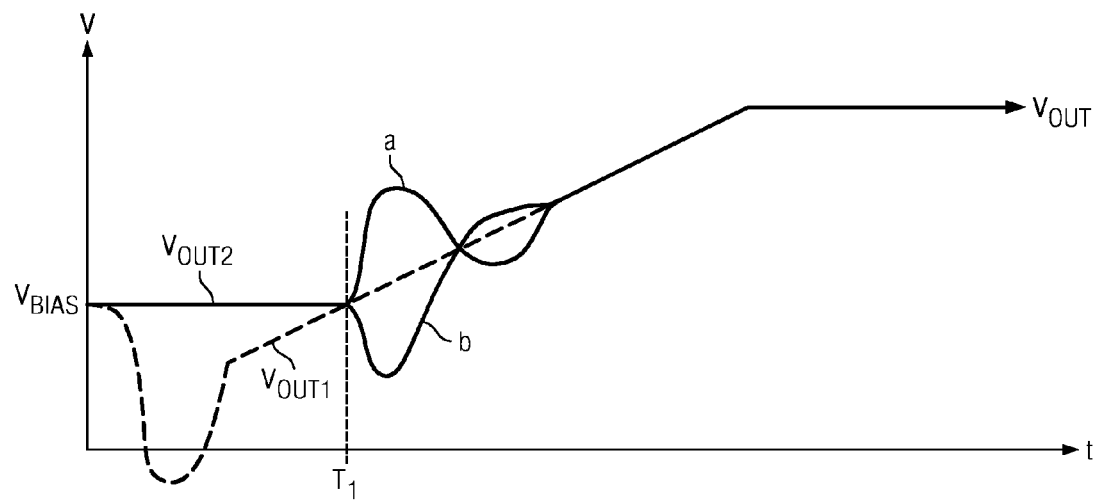
FIG. 2A is a voltage v. time graph of a prior art buck converter's output voltage during two different start-up conditions.
Figure 2B:
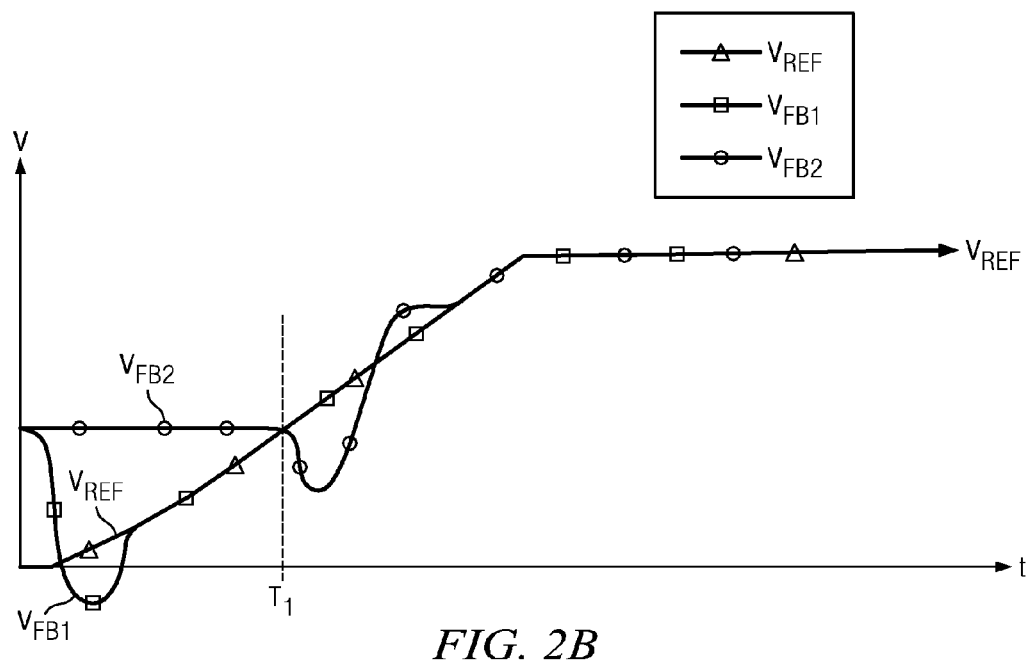
FIG. 2B is a voltage v. time graph of a prior art buck converter's feedback voltage during the same two different start up conditions as in FIG. 2A.

Referring now to FIGS. 2A and 2B, two voltage versus time charts are shown to provide additional understanding into experimentation that lead to embodiments of the invention. In FIG. 2A the dashed line Vout1 signal is shown to depict a situation where the output bias voltage exists on the V output 12 of a tested prior art buck voltage converter. In FIG. 2B, one can see that at initialization the V reference voltage is a soft start ramped voltage, which starts at 0 and increases linearly up to the maximum V reference voltage. The V feedback 1 ($V_{FB1}$) voltage is the feedback voltage that goes to the error amplifier and pulls the Vout1 voltage from its initial V bias voltage level down to 0 or even below 0 volts and then finally as the V feedback 1 voltage increases with the voltage reference voltage, the Vout1 voltage increases substantially linear with the soft start voltage reference $V_{REF}$.

In another modeling of how a prior art buck converter will operate with an initial bias voltage at the output node 12, the switching transistors 14 and 16 were turned off at initialization. By turning the switching transistors off at initialization, the switching node 50 was able to float at the initialized bias voltage as shown as voltage Vout2 in FIG. 2A. In FIG. 2B, one can see that the voltage feedback 2 ($V_{FB2}$) is held at substantially a steady voltage like the Vout 2 until time $T_1$. At time $T_1$, the soft start voltage reference ramp ($V_{REF}$) equals the voltage feedback 2 ($V_{FB2}$), voltage which starts the error amplifier and the pulse width modulator's output 20 to begin creating a modulated switching signal 20 to the switching transistors. At this point in time ($T_1$), one can see that because the modulation signal 20 is not set prior to initialization, there can be a large fluctuation in the Vout2 voltage at $V_{OUT}$ 12 shown as Vout2A and Vout2B in FIG. 2A. The feedback signal $V_{FB2}$, shown in FIG. 2B, provides appropriate feedback to the error amplifier in conjunction with the V reference signal 44 to smooth out the output voltage Vout2 in FIG. 2A prior to the appropriate steady state voltage output level being reached at time t. Thus, a solution of initializing a buck converter with both switching transistors turned in the off position will still provide voltage transients at the output that are undesirable to circuit designers using a buck converter to power their sensitive electronic devices. Thus, what is needed is a circuit design and technique for smoothing or keeping the voltage output of a buck converter substantially smooth or with minimum transient limits during the start up or initialization of the circuit regardless of whether the voltage output initializes at 0 volts or a pre-biased voltage.

Referring back to FIG. 1, a voltage comparator 62 is shown within dotted circuit connections. The voltage comparator 62 compares the reference voltage 40 coming from the voltage reference circuit 42 with the voltage feedback signal 34 in order to provide an output signal or ramp signal 64 to the pulse width modulator 18, which will in turn provide appropriate signals to the switching transistors Q1 14 and Q2 16 such that they will be both turned off to allow the switching node 50 to float at the pre-bias voltage. The comparator 62 will hold the signal until the voltage reference 40 is above the voltage feedback voltage 34 and then will allow the error amplifier 32 to operate as discussed above using the soft start voltage reference signal 46. This solution still presents a problem because the output 48 of the error amplifier 32 is not well defined at start up such that positive or negative transients such as Vout2A and Vout2B shown in FIG. 2A may be seen on the output voltage at the $V_{OUT}$ node 12 during the start up and prior to steady state operation of the prior art buck converter device. It is important for power supplies, when initializing to reach their desired output voltage in a monotonic manner and to not fluctuate with increasing and decreasing output voltages prior to reaching their desired or steady state output voltage. Thus it is desirable to provide a circuit that aids in minimizing a fluctuation in the output voltage of a buck converter power supply to provide a nearly monotonic voltage increase to a desired voltage output during start up. If the voltage is not monotonic and instead fluctuates in negative or positive fluctuations it is possible to inadvertently create an undesired power on reset while the device is attempting to power on or reinitialize. Transients at start up are completely undesirable in the outputs of buck converter devices. What is needed is a buck converter device that operates in a manner that does not produce transients, which could cause misfunction or malfunction of other circuitry associated with the buck converter device. Furthermore it would be desirable to initialize an error amplifier 32 and pulse width modulator circuitry 18 in a pre-bias or no bias output voltage circumstance, to provide a proper modulated or modulation signal to the switching transistors such that minimal transients occur on the output voltage of the buck converter circuit.

Figure 3:
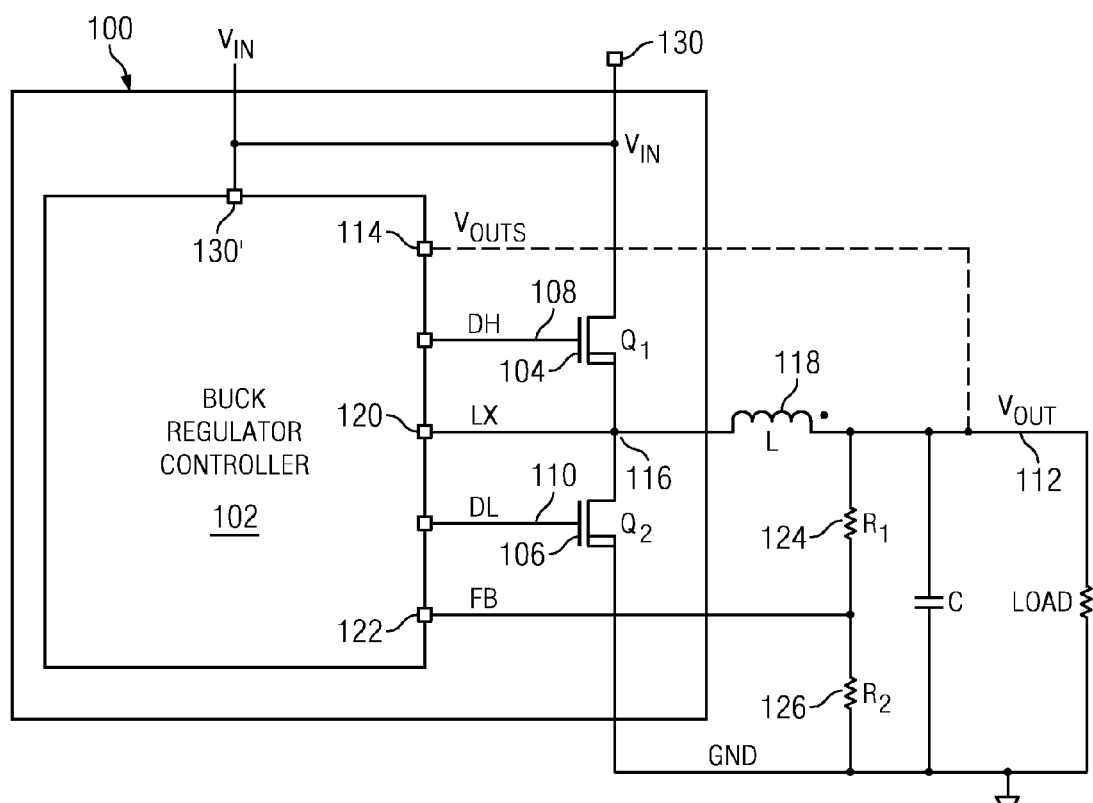
FIG. 3 illustrates a block diagram/schematic of an exemplary switch-mode controller and buck converter circuit.

Referring now to various embodiments of exemplary buck converter devices, it was discovered that the initial duty cycle of a pulse width modulator circuit within an exemplary buck converter could be set at start up, if both the output voltage of the buck converter and the input voltage of the buck converter are measured and utilized to initially set the duty cycle to be equal to the output voltage divided by the input voltage. When an exemplary buck converter circuit is incorporated into actual physical circuitry, whether such actual circuitry be on a circuit card, or within a semiconductor device, the initial output voltage or switching node voltage of the buck converter is difficult to measure at start up. Referring now to FIG. 3 there is shown an exemplary buck converter device 100 comprising the regulator circuitry 102.

As will be explained below, the buck regulator controller circuitry 102 comprises voltage reference circuitry, error amplifiers and pulse width modulation circuits in either analog or digital design embodiments. The switching transistors Q1 104 and Q2 106 are shown having their own modulation signals DH 108 and DL 110 coming from the buck regulator controller circuitry 102. One embodiment of the invention may require an additional means for sensing the output voltage $V_{OUT}$ at the output 112 of an exemplary buck converter. This additional means is shown as a dotted line going to an additional $V_{OUTS}$ pin 114 associated with the buck regulator controller. Although this technique is a functional and appropriate solution to an exemplary embodiment of the present invention, it does require an additional pin on the exemplary switch-mode controller or buck converter device 100. Additional pins on a device mean potential additional connections to the device and additional costs for a manufacturer in routing and creating such pins when designing the circuitry associated with an exemplary buck converter 100.

In another embodiment of the invention, it is realized that at a start up situation for initialization of the buck converter the Q1 104 and Q2 106 switching transistors can be turned off. When the two switching transistors 104, 106 are turned off then the switching node or LX node 116 will have the same potential or voltage as the output voltage $V_{OUT}$ 112 because no current is flowing through the inductor 118. Since an output bias voltage need only be sensed at start up in order to determine whether there is a pre-bias voltage on the output 112 of the buck converter 100 or if that output voltage is 0 then an additional pin is not required for sensing the output voltage at an initialization state of an exemplary buck converter. The initialization state of the output voltage 112 can be sensed via a preexisting pin LX 120, which can be used to sense the switching node or LX node voltage at start up. After start up, the sensing of the output voltage for purposes of determining an initial modulation duty cycle to switch the switching transistors is no longer needed.

An exemplary embodiment may include this circuit configuration incorporated into a silicon die in order to help achieve the wanted monotonic output voltage when a buck converter circuit initializes and comes online to steady state.

It is understood that the feedback pin 122 of an exemplary buck converter device 100 may not, in certain circumstances, meet the initialization voltage sensing requirements because the voltage dividing resistors R1 124 and R2 126 are selected by the device purchaser or a consumer of the buck regulator device and the resistive values will be unknown to the manufacturer of an exemplary switch-mode controller or buck converter device. In other words, the manufacturer of an exemplary device may not know what the attenuation will be between the output voltage at the output voltage node 112 and the feedback voltage at the feedback pin 122 or connection.

It should be understood that in various embodiments of the present invention an exemplary buck converter circuit 100 may be made such that the switching transistors Q1 and Q2 104, 106 are built into the circuit or silicon of the buck converter device or are chosen by the user or designer of the circuitry who are using the switch-mode controller circuit device 102 (buck regulator controller). In either circumstance, the exemplary embodiment simply consists of a buck regulator controller 102 or further comprises the buck regulator circuit 100, which includes the switching transistors and in some circumstances the inductor 118. It is understood that use of the LX or switching node 116 at the initialization of the buck converter circuit for measuring if there is any initial pre-bias voltage at the output 112 of the buck converter can be utilized because the inductor 118 will appear as a short at initialization.

At initialization exemplary embodiments of the invention can compute or evaluate what should be the correct duty cycle from the initial input voltage at $V_{IN}$ 130 or 130' and the initial output voltage at the output 112 to properly initialize the modulation signals DH and DL 108 and 110.

It should be noted that when the Q1 104 and Q2 106 transistors are internal to an exemplary die configuration embodiment, the switching node is also internal to the die.

Figure 4:
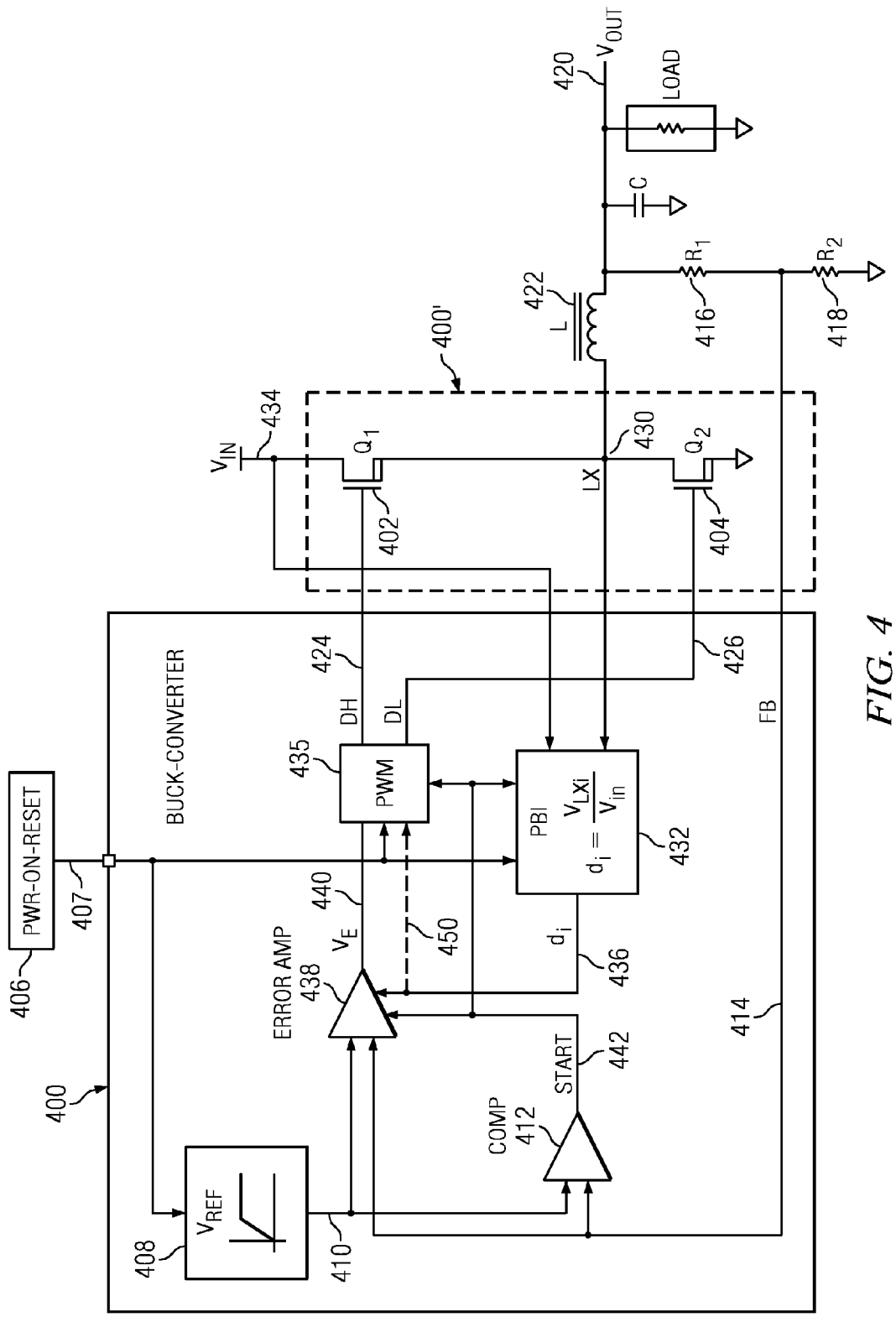
FIG. 4 illustrates another block diagram/schematic of an exemplary switch-mode controller and buck converter circuit.

Referring now to FIG. 4, a component and block diagram of another exemplary buck converter in accordance with an embodiment of the invention is provided. An exemplary buck converter 400 is shown without the switching transistors 402 and 404. In another embodiment of the invention, the switching transistors 402 and 404 may be included in an exemplary buck converter 400'.

When a power on reset signal or start signal is provided by, for example, a power on reset circuit 406, to an input of an exemplary buck converter 400 or 400', a voltage reference circuit 408 begins a soft start voltage output signal $V_{REF}$ 410. The soft start voltage reference signal starts generally at about 0 volts and then increases its output until the voltage reference's steady state voltage is reached. A comparator 412 compares the output of the voltage reference circuit 408, being the soft start voltage reference signal 410, with a feedback voltage 414 from the voltage divider circuit comprising R1 416 and R2 418. The feedback voltage 414 directly relates to the initial or start up output voltage $V_{OUT}$ 420 at the output of the inductor 422 associated with the exemplary buck converter 400 or 400'. At the initial state of an exemplary buck converter, the switching transistors Q1 and Q2, 402 and 404, are both off. The comparator 412 is comparing the voltage reference signal 410 with the feedback signal 414 to determine when they are substantially equal. The reason for this initial determination is that an exemplary buck converter will not produce a DH 424 or DL 426 modulation signal to switch the transistors until the feedback voltage 414 is substantially equal to the reference voltage signal 410.

Since initially the switching transistors 402 and 404 are not switching and are off the LX or switching node 430 will have the same voltage or potential as the output voltage 420 because the inductor 422 will look like a short at initialization. The LX or switching node voltage can be read by a pre-bias initialization circuit 432. The pre-bias initialization circuit can also read the input voltage at $V_{IN}$ 434. The pre-bias initializer circuit 432 computes the initial duty cycle for the pulse width modulator such that the initial modulation of a pulse width modulator circuit 435 is defined just after initialization of an exemplary buck converter 400 or 400'. The output of the pre-bias initializer 432 is the initial duty cycle signal ($d_i$ 436). The initial duty cycle signal ($d_i$) 436 may be calculated by taking the ratio of the initial output voltage 420, which is substantially the same as the initial LX or switching node voltage 430, and dividing it by the input voltage found at the voltage input 432. The pre-bias initializer 432 provides the initial duty cycle signal 436 to the error amplifier 438. The error amplifier 438 outputs a voltage error signal 440 in accordance with the received initial duty cycle signal ($d_i$) 436 so that the pulse width modulator circuit 435 is set to provide an appropriate pulse width modulation signal (S) 424, 426 to the switching transistors when the comparator 412 indicates that the feedback voltage 414 and the voltage reference voltage 410 are substantially the same.

When the comparator amplifier 412 determines that the voltage reference signal 410 and the voltage feedback signal 414 are substantially the same, a start signal 442 is provided from the comparison amplifier 412 to the error amplifier. The error amplifier 438 will then no longer provide an error voltage 440 in accordance with the pre-bias initializers $d_i$ 436 input, but instead will provide a voltage error signal 440 in accordance with the difference between the voltage reference signal 440 and the feedback signal 414. Thus, the pulse width modulator circuit 434 will provide switching signals to the switching transistors Q1 and Q2, 402, 404 such that the output voltage seen at the voltage output 420 is substantially similar to the initial voltage sensed at the switching node or LX node 430 at circuit initialization.

As the soft start ramp voltage reference signal continues to increase, the output voltage will also continue to increase without producing any significant fluctuations or spikes in the output voltage 420. The output voltage will increase until it reaches the steady state voltage output of the exemplary buck converter.

As such, it is shown that embodiments of the invention provide the buck converter circuit that produces a smooth output from the circuit's initialization to steady state voltage output without any significant transients regardless of whether the output voltage node is initialized at zero volts or at a pre-bias voltage.

Embodiments of the invention can initialize and set an initial pulse width modulation signal for switching a switching transistor (402) or transistors (402 and 404) to switch appropriately to produce a proper output voltage 420 substantially equivalent to the initial output voltage. Furthermore, the switching transistors do not receive or respond to a switching signal from the pulse width modulator 434 until the comparison circuit 412 senses that the feedback voltage 414 and the ramping up of the voltage reference soft start signal 410 are substantially equal.

Still referring to FIG. 4, variations and other exemplary embodiments of the invention will now be discussed. In some embodiments, the start up comparison amplifier 412 may be incorporated into or be synonymous with the error amplifier 438. In other embodiments, the error amplifier 438 may be part of or synonymous with the pulse width modulator 434. Furthermore, the error amplifier 438, the pulse width modulator 434 and the pre-bias initialization circuit 432 may each be implemented in either analog circuitry or via digital design or software. Thus, embodiments of an exemplary buck converter 400 or 400' could be an analog device, a digital device, a hybrid of analog and digital technologies or implemented in software.

FIG. 4 also depicts the power on reset circuit 406 which may provide a power on reset signal to an exemplary device 400, 400'. The power on reset signal 407 may be received by the voltage reference circuit 408 so that the soft start voltage reference circuitry will begin at 0, near 0 volts or another predetermined initial voltage. Furthermore, at a start-up or power-on reset, the pulse width modulation circuit 434 will need to be reinitialized and the pre-bias initialization circuitry 432 will also need to be informed to sense for the initial conditions of the input voltage 434 as well as the output voltage 420 found at the LX or switching node 430 of an exemplary device. In yet another embodiment of the invention, the duty cycle initialization signal 436 may be provided to the pulse width modulation circuit 34 via the optional connection 450, to set an initial well defined output duty cycle to the pulse width modulation circuit 435 for outputs DH and DL.

Embodiments of the invention start switching the switching transistors 402 and 404 after the voltage of the output of the soft start ramp voltage reference 408 is substantially the same or greater than the feedback voltage 414. This is done, as explained, to minimize any voltage transients, either positive or negative transients, when the switching transistors start switching. Embodiments of the invention determine the necessary duty cycle of the modulated switching signals DH 424 and/or DL 426 such that the switching transistors 402 and 404 begin switching at a duty cycle that will produce substantially the same voltage at the output 420 that is equal or substantially equal to the initial voltage of the output 420 and/or the switching node 430 when a start up signal or power on reset signal is received by an embodiment of the invention. At start up or initialization the switching node 430 is substantially equivalent to the output 420.

Basically there are two things that are necessary to eliminate or substantially eliminate a transient voltage at the output of a buck converter at startup. One thing is for the inputs to the error amplifier 438 to be approximately equal such that the error amplifier 438 will not be providing an output 440 to radically change the duty cycle of the pulse width modulator circuit's output. The second thing is that either the error amplifier 438 and/or the pulse width modulation circuit 435 are initialized with a correct, well defined duty cycle so that with or without an error difference at the inputs of the error amplifier 438, the switching transistors are switched at an initial modulation frequency so that the voltage produced at the output of the inductor 422 is substantially the same as the initial voltage sensed by the pre-bias initialization circuit 432. When both these conditions are met, a minimal or substantially non-existent transient will exist at the output 420 of an exemplary buck converter at initialization.

After the start-up/initialization of an exemplary buck converter, the comparison amplifier 412 and the pre-bias initialization circuit 432 are no longer required. Thus, during steady state the comparison amplifier 412 and the pre-bias initialization module 432 may be powered down or left unused to help minimize the amount of power required by an exemplary device. It is conceived that in analog based exemplary buck converter the duty cycle initialization signal 436 would probably be provided by the pre-bias initialization circuit 432 to the error amplifier 438. Conversely, in a digitally designed or digital based circuit the $d_i$ or duty cycle initialization signal 436 would probably be provided to the pulse width modulation circuitry 434.

Figure 5A:
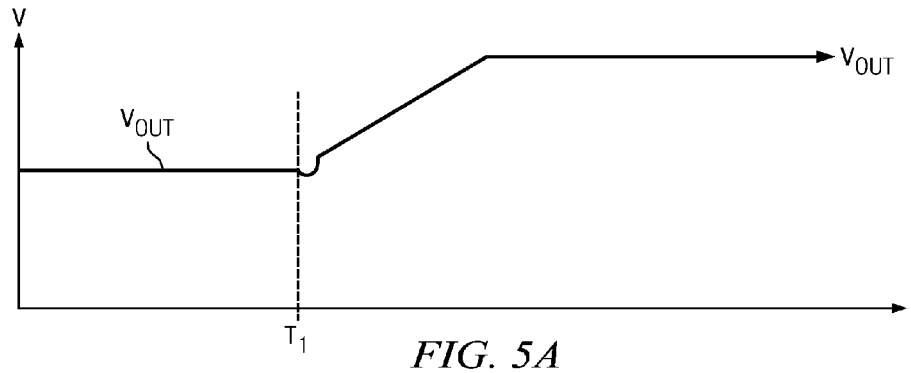
FIGS. 5A-5C illustrate graphs of voltage output, voltage reference and voltage reference voltages for embodiments of the invention.
Figure 5B:
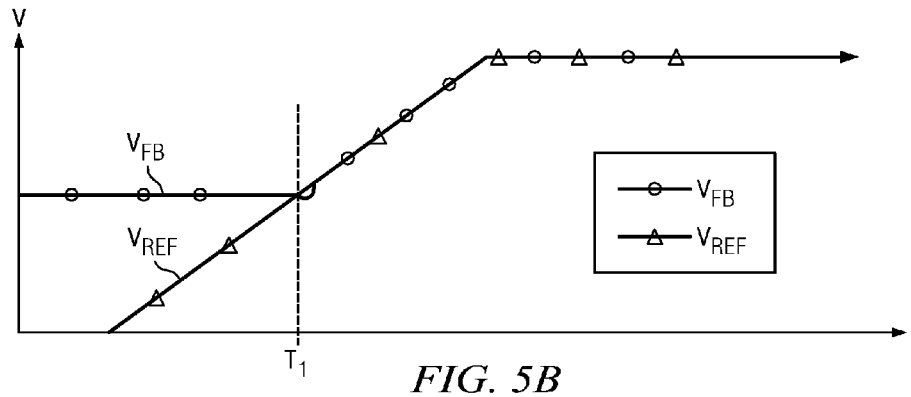

Referring now to FIGS. 5A and 5B, FIG. 5A depicts the output voltage of an exemplary buck generator having an initial pre-bias voltage at start up or power on reset. FIG. 5B depicts a graph showing the soft start voltage reference signal along with the voltage feedback signal, which are both being provided to the comparison amplifier 412 and the error amplifier 438. FIG. 5B shows that, at time $T_1$ where the voltage reference signal is equal to the feedback voltage and when the correct duty cycle signal is being provided to the pulse width modulator, when switching begins at $T_1$ there will be a minimal transient at the voltage output. FIG. 5A shows an insignificant transient occurring at time $T_1$. After time $T_1$, the output voltage ramps up with the soft start voltage reference signal ($V_{REF}$) until the steady state output voltage is provided. A small negligible transient is shown in FIGS. 5A and 5B because in practice there may be a negligible transient at the moment that the transistors begin switching. Essentially the transient should be negligible, minimal or non-damaging at most. It is important to understand that with only a negligible transient at the output of an exemplary buck converter, less electrical stress or causes for malfunction or misfunction are placed on the electrical circuitry being driven or powered by the output voltage of an exemplary buck converter. Without a significant transient, there is no large amount of current flowing through the switching transistors, the output inductor or into the circuitry being powered by an exemplary buck converter as the feedback circuitry adjusts the error amplifier and pulse width modulation signals. Furthermore, by not having a voltage transient when switching begins, not only are higher currents and voltage stresses being minimalized or eliminated by the output of an exemplary buck converter, which is operating more closely to an ideal model of a buck converter than prior art buck converters seen in the industry to date. That is, in an ideal buck converter the output voltage, upon initialization, goes from the initial output pre-biased voltage and then smoothly ramps to the final value or steady state output voltage of the device.

Figure 5C:
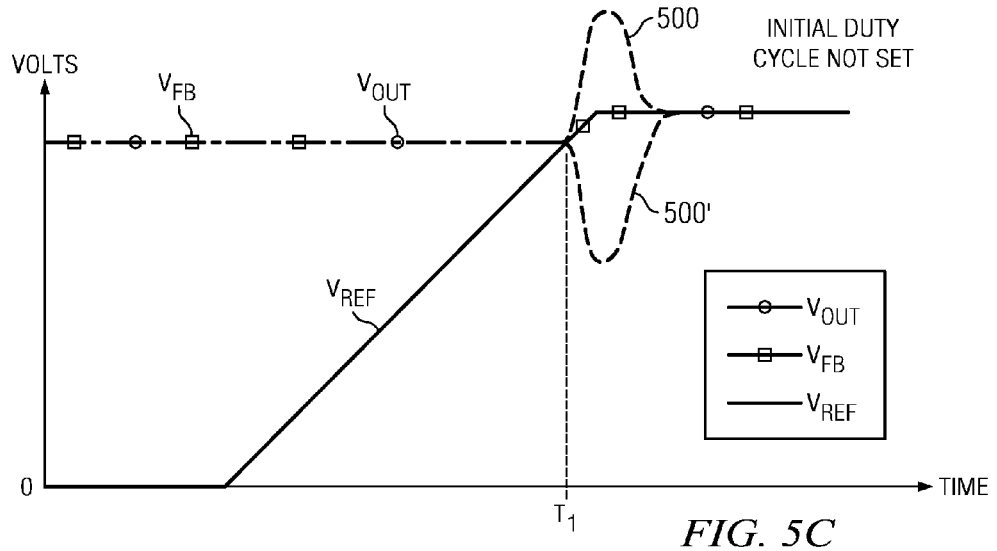

Referring now to FIG. 5C, another graph is provided that shows how in a particular circumstance, embodiments of the invention greatly outperform prior art devices. Here, in FIG. 5C, for example, in the pre-bias condition of a prior art buck converter, the initial output voltage is very close to the steady state output voltage of the buck converter. At initialization, the switching transistors are turned off until the voltage reference ramps up to be substantially equal to the feedback voltage, then without a well defined or precalculated duty cycle initialization signal a prior art pulse width modulator may create an output transient 500 or 500' when switching is initialized. Such a large output voltage transient of a prior art buck converter can be extremely damaging to sensitive circuitry utilizing the regulated output voltage of the buck converter. It should be noted that in FIG. 5C the output voltage and the voltage feedback signals are drawn to different scales such that the feedback voltage is not attenuated. Conversely, if an embodiment of the invention is utilized, a large transient would not be created because the pulse width modulator circuitry will be initialized with a signal that sets its DH and/or DL modulation signals to the switching transistors at a duty cycle that produces substantially the same output voltage as the pre-biased voltage that was sensed by the pre-bias initialization circuit 432.

Figure 6:
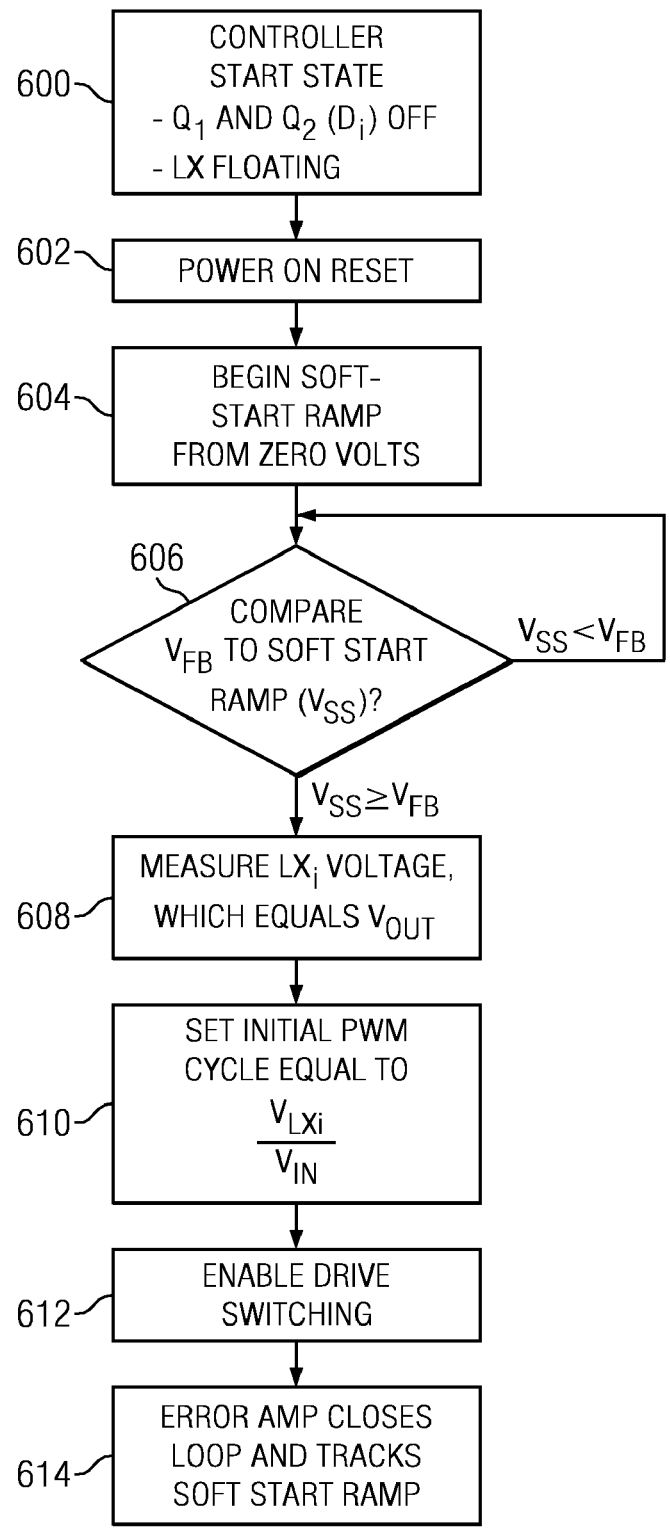
FIG. 6 illustrates a flow chart of exemplary workings and functions of embodiments of the invention.

Referring now to FIG. 6, wherein a flow chart of an exemplary start up sequence in accordance with an embodiment of the invention is shown. Initially at step 600, an exemplary buck converter controller or buck converter circuit is at a start state. When a buck converter is in a start state, both of the switching transistors Q1 402 and Q2 404 are off. Furthermore, the switching node or LX pin or connection is floating at an initial start state voltage. The initial start state voltage may be 0 volts or a pre-bias voltage that is substantially equal to the output voltage of the buck converter circuitry 420. At step 602, an exemplary device receives a power on reset signal or start signal from either an internal or external circuitry. At step 604, the power on reset signal is sensed by one or more circuits or modules in an exemplary embodiment. A voltage reference circuit or module begins a soft ramp voltage reference start up from 0 volts (or a predetermined voltage) and provides the soft ramp start up signal to a comparison circuit or module. Immediately, at step 606 a comparison is made between a voltage feedback signal and the soft start ramp voltage. If the comparison indicates that the soft start ramp voltage is less than the voltage feedback signal, the method idles. While the method idles or waits, the switching transistors, Q1 and Q1, remain in an off state. When the comparison of the feedback voltage signal and the soft start ramp signal indicate that the voltage of the soft start ramp signal is greater than or equal to the voltage feedback signal then the method advances to step 608. At step 608, the system measures the LX or switching node pin voltage, which is substantially equal to the output voltage of the buck converter circuitry since the switching transistors are not switching and the inductor between the LX node and the output node is essentially acting as a short. It is further understood that step 608 may occur prior to or substantially at the same time as step 606.

At step 610, a pulse width modulation duty cycle is set substantially equal to the ratio of the output voltage divided by the input voltage of the buck converter. At the initial state when the switching transistors are off the output voltage is substantially equal to the voltage of the LX node. At step 612 the switching transistor or transistors are enabled with the calculated initial pulse width modulation cycle signal so that the switching of the transistors produce an output voltage substantially equal to the measured initial LX node voltage from step 608. At step 614 the feedback loop comprising a feedback signal having a voltage relative to the output voltage and the voltage reference signal from the soft start voltage ramp close the feedback loop and track the soft start ramp as it works its way up to and settles at the steady state output voltage.

It will be appreciated by those skilled in the art having the benefit of this disclosure that this method for determining pre-bias in a switch-mode controller provides a startup output voltage that lacks a transient large enough to produce a malfunction or misfunction in circuitry being driven or powered by a switch-mode controller or buck converter regulated power supply circuitry. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method of determining a pre-bias voltage by a switch mode controller at start up or at a power-on-reset, the method comprising:
    receiving by a switch mode controller an input voltage or a power-on-reset signal;
    generating a voltage reference having a predetermined voltage;
    comparing the voltage reference with a feedback voltage and outputting a start signal to an error circuit and a pre-bias initialization circuit when the voltage reference is greater than or equal to the feedback voltage;
    measuring an initial switching node voltage or an equivalent voltage and outputting an initial duty cycle signal to the error circuit upon receipt of the start signal by the pre-bias initialization circuit, the initial duty cycle set substantially equal to a ratio of an output voltage and the input voltage; and
    providing a voltage error signal to a pulse width modulator when the start signal and initial duty cycle are received by the error circuit, the pulse width modulator configured to provide a pulse width modulation signal to enable at least one switching transistor to switch to provide an output voltage and to delay providing of the pulse width modulation output signal until the start signal and the initial duty cycle signal are received by the error circuit.

2. The method of claim 1, further comprising setting an initial pulse width modulation signal to have a duty cycle configured to enable at least one switching transistor to switch to produce an output voltage substantially equal to the initial switching node voltage or the equivalent voltage when the voltage error signal is received by the pulse width modulator.

3. The method of claim 1, wherein the at least one switching transistor comprises two switching transistors.

4. The method of claim 1, wherein the voltage reference is a soft start voltage reference that ramps up from a first voltage reference voltage to a steady state voltage reference.

5. The method of claim 1, wherein the initial pulse width modulation signal duty cycle is substantially equal to the ratio of the initial switching node voltage and the input voltage.

6. The method of claim 1, wherein the equivalent voltage is equal to the initial output voltage.

7. The method of claim 1, wherein the switch mode controller is for a buck converter.

8. A switch mode controller comprising:
    a voltage reference node comprising a reference voltage;
    a voltage input node adapted configured to receive an input voltage;
    a pulse width modulation circuit comprising:
        an error circuit configured to receive the reference voltage and the feedback voltage and produce an error signal; and
        a pulse width modulator configured to provide a pulse width modulation output signal in response to the error signal;
    a comparator circuit configured to compare the reference voltage with a feedback voltage and output a start signal to the error circuit and a pre-bias initialization circuit when the reference voltage is greater than or equal to the feedback voltage;
    the pre-bias initialization circuit configured to measure an initial voltage at a switching node or an equivalent node and output an initial duty cycle signal to the error circuit upon receipt of the start signal, the initial duty cycle set substantially equal to a ratio of an output voltage and the input voltage; and
    the pulse width modulation circuit configured to delay providing of the pulse width modulation output signal until the start signal and the initial duty cycle signal are received by the error circuit.

9. The switch mode controller of claim 8, wherein the pulse width modulator is configured to provide the pulse width modulation output signal in response to the error signal after providing the pulse width modulation output signal in response to receipt of the start signal and initial duty cycle signal by the error circuit.

10. The switch mode controller of claim 8, wherein the pre-bias initialization circuit measures the initial voltage at the switching node or an equivalent node, wherein the equivalent node comprises a voltage output node of a buck converter circuit prior to the output of the start signal.

11. The switch mode controller of claim 8, further comprising at least one switching transistor having a base or gate electrically connected to the pulse width modulation output signal.

12. The switch mode controller of claim 8, wherein the initial duty cycle signal is substantially directly related to a ratio of the initial voltage and the input voltage at the time the start signal is output.

13. The switch mode controller of claim 8, wherein the voltage reference is a soft start voltage reference that is initialized at a predetermined voltage and ramps up to a fixed reference voltage.

14. The switch mode controller of claim 8, wherein the switch mode controller is incorporated into a buck converter circuit.

15. The switch mode controller of claim 8, wherein the pulse width modulation circuit outputs are held low until the start signal is received by the pulse width modulation circuit.

16. A buck converter comprising:
    a switch mode controller comprising:
        a voltage reference node comprising a reference voltage;
        a voltage input node configured to receive an input voltage;
        a pulse width modulation circuit comprising:
            an error circuit configured to receive the reference voltage and the feedback voltage and produce an error signal; and
            a pulse width modulator configured to provide a pulse width modulation output signal in response to the error signal;
        a comparator circuit configured to compare the reference voltage with a feedback voltage and output a start signal to the error circuit and a pre-bias initialization circuit when the reference voltage is greater than or equal to the feedback voltage;
        the pre-bias initialization circuit configured to measure an initial voltage at a switching node or an equivalent node and output an initial duty cycle signal to the error circuit upon receipt of the start signal, the initial duty cycle set substantially equal to a ratio of an output voltage and the input voltage; and
        the pulse width modulation circuit configured to delay providing of the pulse width modulation output signal until the start signal and the initial duty cycle signal are received by the error circuit; and a first switching transistor, connected to the pulse width modulation signal output; the first switching transistor being off until the pulse width modulation circuit receives the start signal.

17. The buck converter of claim 16, further comprising a second switching device that is off at least until the pulse width modulation circuit receives the start signal.

* * * * *